W. H. McLEOD.
MOVABLE HEADLIGHT.
APPLICATION FILED APR. 29, 1921.

1,411,924.

Patented Apr. 4, 1922.
2 SHEETS—SHEET 1.

W. H. McLeod
INVENTOR

WITNESS:
E. P. Ruppert.

BY Victor J. Evans
ATTORNEY

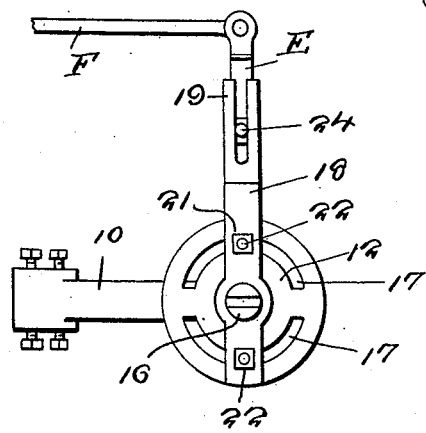
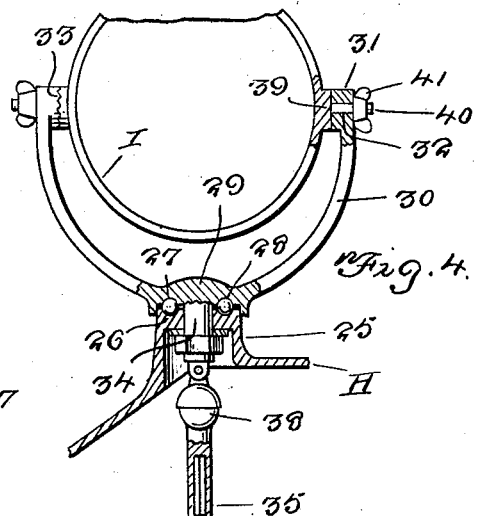
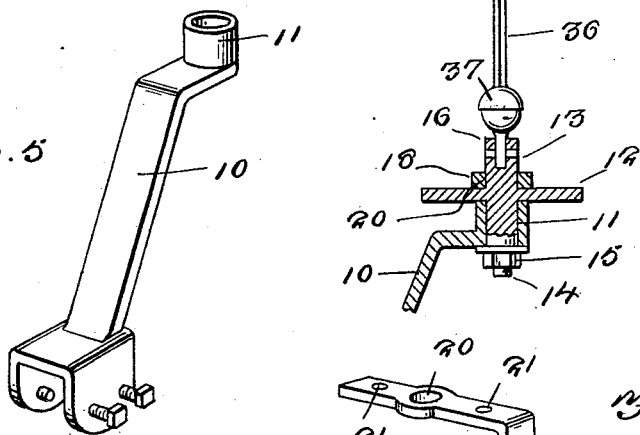
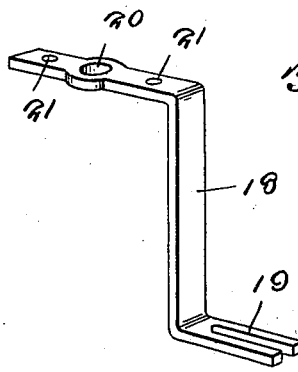
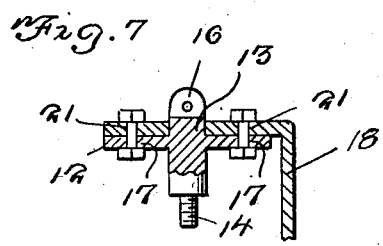

UNITED STATES PATENT OFFICE.

WALTER H. McLEOD, OF GRANITE FALLS, MINNESOTA.

MOVABLE HEADLIGHT.

1,411,924.  Specification of Letters Patent.  Patented Apr. 4, 1922.

Application filed April 29, 1921. Serial No. 465,406.

*To all whom it may concern:*

Be it known that I, WALTER H. McLEOD, a citizen of the United States, residing at Granite Falls, in the county of Yellow Medicine and State of Minnesota, have invented new and useful Improvements in Movable Headlights, of which the following is a specification.

This invention relates to head lamps for automobiles or other vehicles, particularly to those of the dirigible type, and has for its object the provision of novel mechanism whereby to cause the headlamps to turn in a direction corresponding to the turning movement of the vehicle, the movement of the lamps being effected automatically upon actuation of the steering gear.

An important and most specific object is the provision of a dirigible head lamp mechanism of this character which is so constructed that it may be formed as an attachment to the vehicle without necessitating any alterations in the latter, all the parts of my device being merely bolted in position.

Another object is the provision of a dirigible headlight mounting of this character in which the construction is such that there is relative up and down movement between the body of the vehicle and the frame or running gear owing to the provision of a telescopic connecting shaft which permits the relative movement.

A further object is the provision of a mechanism of this character which is adjustable so that it may be used upon vehicles of different makes or types, universal joint members being provided in the mechanism whereby to permit the necessary flexibility.

Still another object is the provision of a dirigible headlight construction of this character in which the lamps proper are rotatably mounted for adjustment within their supporting supports or brackets so that their positions may be regulated so as to direct the rays of light issuing from the lamps in the proper direction and proper inclination.

An additional object of the invention is the provision of a device of this character which will be simple and inexpensive in manufacture and installation, highly efficient in use, durable in service and a general improvement in the art.

With the above and other objects in view, the invention consists in the details of construction to be hereinafter more fully described and claimed and illustrated in the accompanying drawings, in which:

Figure 3 is a plan view of the front axle and associated parts and showing my device associated therewith.

Figure 4 is a vertical sectional view through one of the devices, showing the telescopic shaft.

Figure 5 is a detail perspective view of the bracket member secured upon the axle, Figure 6 is a detail perspective view of the slotted plate carried by the bracket and Figure 7 is a detail sectional view taken at right angles to Figure 4 and showing the structure connected with the lower end of the telescopic shaft.

Figure 1:
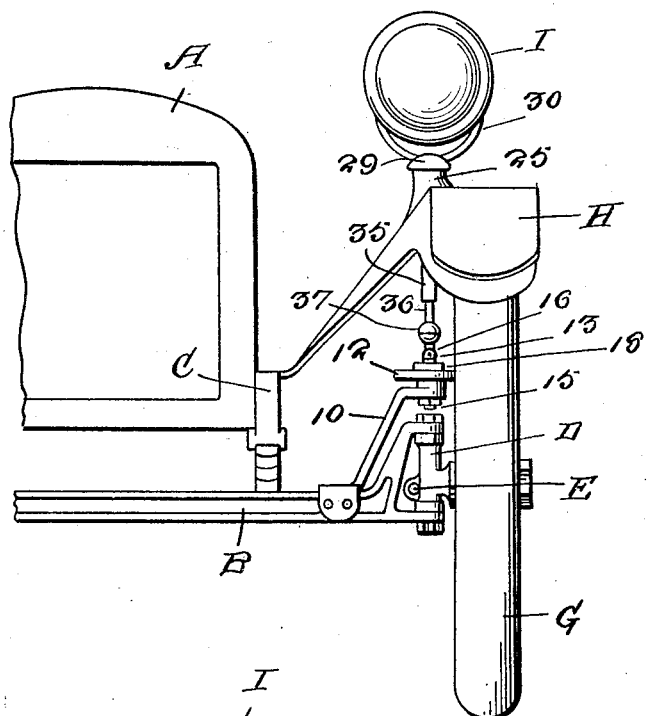
Figure 1 is a front elevation of an automobile equipped with my mechanism.
Figure 2:
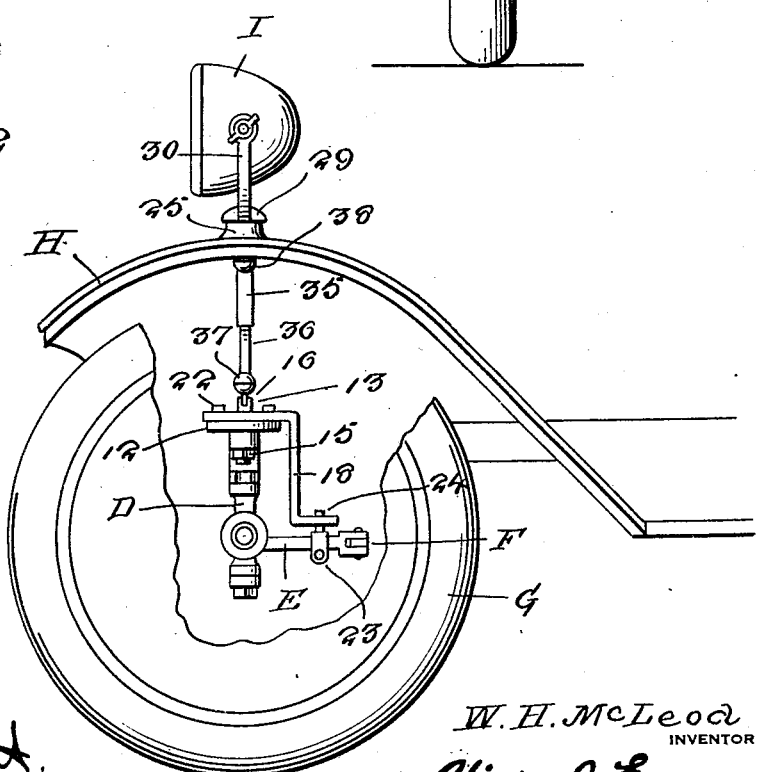
Figure 2 is a side elevation thereof with the forward wheel removed to more clearly disclose the construction.

Referring more particularly to the drawings the letter A designates the front portion of an automobile, B the front axle, C the side bars of the frame, D the steering spindle body from which extends the spindle arm E and F designates the steering rod which connects the steering spindle arm. The front wheels of the automobile are designated by the letter G.

In carrying out my invention I provide suitable brackets 10 secured upon the end portions of the axle and spaced to overlie the forked ends of the axle as clearly shown, with their upper end portions formed with holes 11. Disposed upon the upper or free end of each bracket 10 is a plate 12 having a central extension 13 revoluble within the hole 11 and terminating in a reduced threaded extension 14 upon which is engaged a clamping nut 15 for holding the parts in position. Extending upwardly from the opposite side of the plate 12 is a slotted extension 16 for a purpose to be described. The plate 12 is formed with arcuate slots 17.

The numeral 18 designates an angularly shaped lever which has one end forked as shown at 19 and which has its other end portion formed with a hole 20 registering with the hole 11, this second mentioned end being also formed with spaced holes 21 for the passage of securing bolts 22 which also pass through the arcuate slots 17 in the plate 12. By this construction it will be seen that the lever 18 is rigidly secured to the plate 12 and at the same time the connection is adjustable for reasons which will be hereinafter made apparent.

Rigidly secured upon each of the spindle arms E is a clip 23 which carries an upstanding lug 24 engaged within the forked end 19 of the lever 18.

The numeral 25 designates a supporting standard which is secured upon the angular arm which connects the front fender H with the frame of the automobile, or which in some instances is mounted directly upon the fender at the bend therein. At its upper portion this standard 25 carries a ball race 26 within which are disposed bearing balls 27 which likewise engage in a race 28 formed in the underside of a head 29 which is thus rotatable upon the standard or support 25. This head 29 carries a U-shaped member or fork 30 which has the ends of its arms formed or provided with disks 31 having central holes 32 and provided on their confronting faces with serrations 33. The head 29 is pivotally connected with the support 25 by means of a depending stem 34 suitably secured to the head.

In order to attain an operative connection between the extension 16 of the disk 12 and the stem 34, I provide a telescopic shaft which includes sections 35 and 36, square in cross section, one of which slides within the other. One end of this telescopic shaft is connected by a universal joint 37 with the upper end of the extension 16 and the upper end of the telescopic shaft is connected by a universal joint 38 with the lower end of the stem 34.

With my device constructed and assembled as above described, it will be seen that when the steering gear, not shown, of the automobile is operated to turn the front wheels in either direction depending upon the course of travel desired, it will be apparent that the movement of the steering spindle bodies and the arms E thereof will cause swinging of the levers 18 owing to the engagement of the lugs 24 within the forks 19 of the levers. As these levers are thus swung it will be apparent that the plates 12 will be rotated and that therefore the telescopic shaft formed of the sections 35 and 36 will be correspondingly rotated and this will result in turning of the head 29 carrying the fork 30 which supports the headlamp. The headlamp is designated by the letter I and is disposed within the fork 30. At opposite sides the headlamp carries extensions 39 from which extend stems or studs 40 which pass through the holes 32 in the disk 31 and which are provided with clamping nuts 41. The outer faces of the extensions or projections 39 are toothed or serrated for corresponding engagement with the serrations 33 of the disk 31 and it will be apparent that this peculiar mounting of the lamp will enable the lamp to be tilted forwardly or rearwardly as may be necessary in order to place the headlamps at proper position so that the rays of light issuing therefrom will pass out in the proper direction.

Owing to the provision of the universal joint connections 37 and 38 between the telescopic shaft and the fork and operating means it will be apparent that the device may be used to equal advantage upon different makes or types of machines in spite of the fact that the dimensions of the parts on the different machines will vary. It is also to be observed that owing to the fact that the operating shaft is formed of the telescopic sections 35 and 36, there will be up and downward play permitted between the vehicle body and the axle as must of course occur when the vehicle travels over rough or uneven ground. This telescopic feature also enables the device to be attached successfully upon automobiles in which the fenders are at varying distances above the axle. Another important feature is the provision of the arcuate slots 17 in the plate 12 which permits adjustment of the plate 12 and the arm or lever 18 relatively to adjust the telescopic shaft so that the headlamps will normally face straight ahead.

While I have shown and described the preferred embodiment of the invention, it is of course to be understood that I reserve the right to make such changes in the form, construction and arrangement of parts as will not depart from the spirit of the invention or the scope of the subjoined claim.

Having described the invention what is claimed is:

A dirigible headlight construction for automobiles comprising a bracket secured upon each end of the front axle of the chassis and overlying the fork which carries the steering spindle body, the upper end of each bracket being formed with a hole, a plate member disposed horizontally upon the upper free end of the bracket and having a depending extension journaled through said hole, said plate member being formed with arcuate slots and with an upwardly extending central projection, a support mounted upon each front fender adjacent the bend therein toward the vehicle frame, a fork rotatably mounted upon said support and carrying a head lamp, and a telescopic shaft connected by universal joints with the lower end of said fork and with the upper extension on the associated plate, an upwardly extending lug member secured upon each steering knuckle arm, and a lever having a forked end engaging within said lug and having its other end adjustably connected with the associated plate by means of bolts passing through said arcuate slots.

In testimony whereof I affix my signature.

WALTER H. McLEOD.